United States Patent [19]

Van Blaricon et al.

[11] Patent Number: 5,232,054
[45] Date of Patent: Aug. 3, 1993

[54] FRONT FOLDING NO-TILL DRILL

[75] Inventors: James I. Van Blaricon; Eric Johnson; J. Michael McClure; Dan J. Obenland, all of Salina, Kans.

[73] Assignee: Great Plains Manufacturing, Incorporated, Assaria, Kans.

[21] Appl. No.: 800,985

[22] Filed: Dec. 2, 1991

[51] Int. Cl.$^5$ ............... A01B 49/00; A01B 63/32
[52] U.S. Cl. .................. 172/311; 172/456; 280/412; 280/413
[58] Field of Search ........... 172/311, 456, 459, 776; 111/53, 57; 280/412, 413; 239/167

[56] References Cited

U.S. PATENT DOCUMENTS

| | | | |
|---|---|---|---|
| 4,171,022 | 10/1979 | Applequist | 172/311 |
| 4,211,288 | 7/1980 | Applequist | 172/328 |
| 4,319,643 | 3/1982 | Carter et al. | 172/311 |
| 4,425,471 | 1/1984 | Allen | 172/311 |
| 4,518,046 | 5/1985 | Rettig et al. | 172/311 |
| 4,576,238 | 3/1986 | Spencer | 172/311 |
| 4,664,202 | 5/1987 | Applequist et al. | 172/311 |
| 4,723,787 | 2/1988 | Hadley et al. | 172/456 X |
| 4,763,915 | 8/1988 | Risser | 172/311 X |
| 4,945,997 | 8/1990 | Adee | 172/311 |
| 5,024,279 | 6/1991 | Warner et al. | 172/456 X |

OTHER PUBLICATIONS

Marliss "Multi-Till Soybean and Grain Drill" sales brochure, Oct. 1981.
M&W "Drillmaster Minimum Till Grain Drill" sales brochure, Oct. 1981.
TYE Product Information sheet entitled "Folding Drill" (#1156 R/1; Nov. 1989).

Primary Examiner—Dannis L. Taylor
Assistant Examiner—Spencer Warnick
Attorney, Agent, or Firm—Hovey, Williams, Timmons & Collins

[57] ABSTRACT

The front folding machine has a main fore-and-aft carrier frame provided with transport wheels that may be hydraulically actuated to raise and lower the frame simultaneously with the actuation of gauge wheels on a pair of transverse drill units connected to the rear of the carrier frame, thereby causing the trash cutters and openers which are carried by the drill units to raise out of the ground while the gauge wheels and transport wheels remain in ground engagement. Before folding the drill units forwardly into transport positions extending parallel to the path of travel, the drill units are raised by hydraulically operated tool bars into elevated positions in which the gauge wheels of the units are entirely off the ground and the residue cutters are high enough to clear the transport wheels of the carrier frame as the drill units are folded into the transport position. The tool bars which provide elevation for folding purposes are also provided with flotation pivots by which the drill units are connected to the tool bars so that the individual units can rock laterally about separate fore-and-aft pivots when the machine is unfolded and the gauge wheels encounter changes in terrain during field operations. Flotation limit means associated with the drill units prevent excessive rocking movement during terrain changes and also assist in the control of the drill units during raising and lowering between field and transport positions.

22 Claims, 11 Drawing Sheets

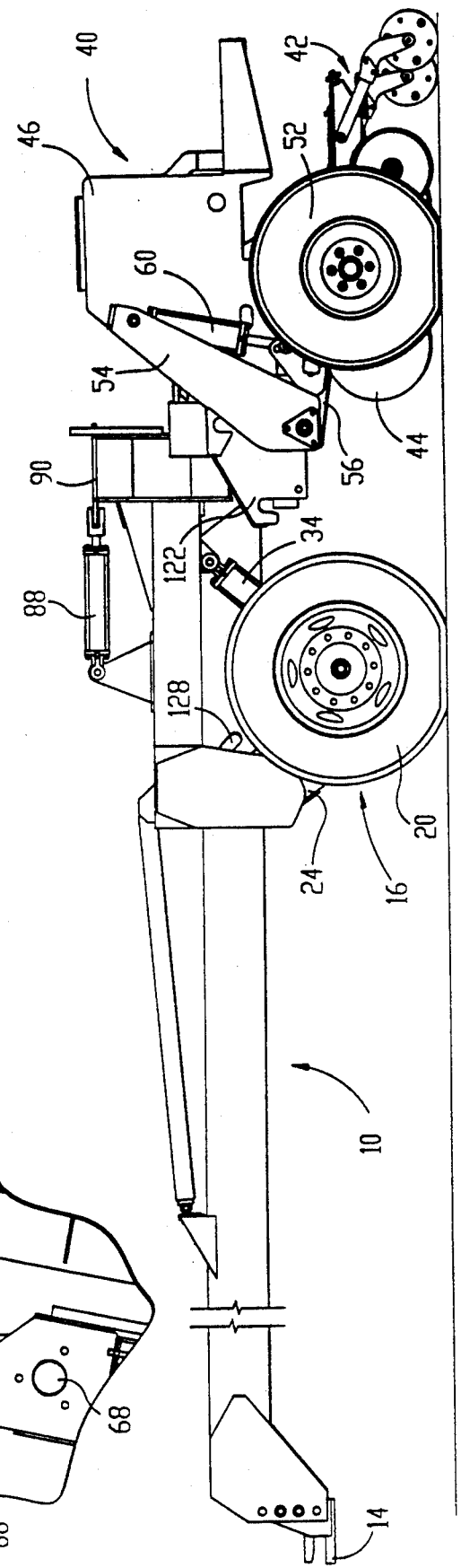
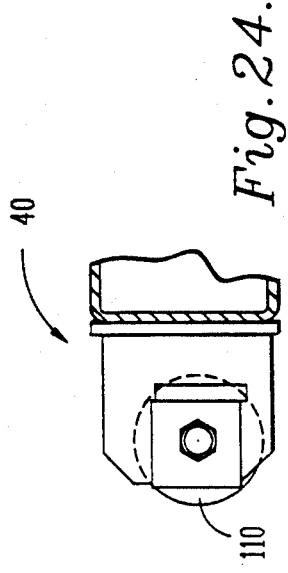
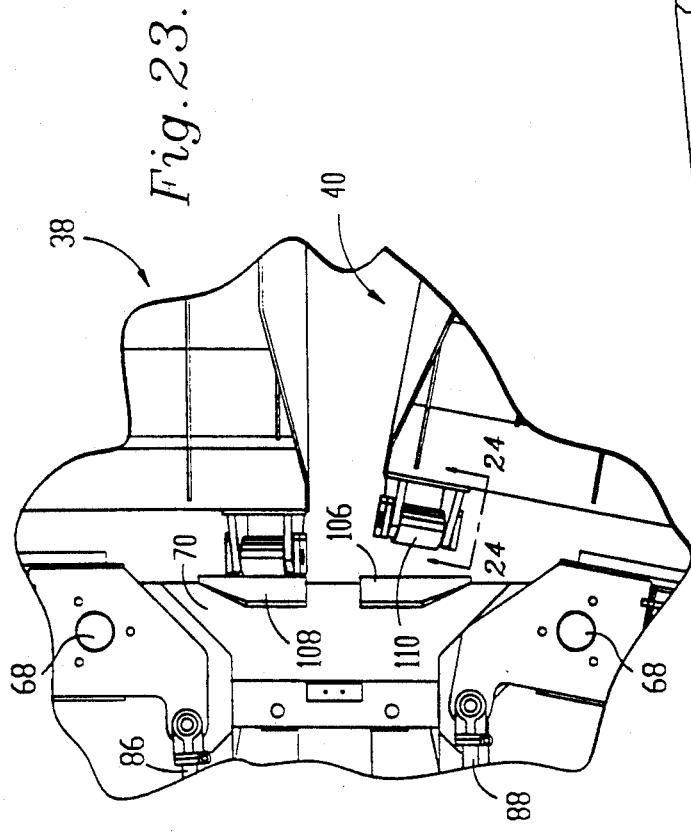
Fig. 24.
Fig. 23.
Fig. 3.

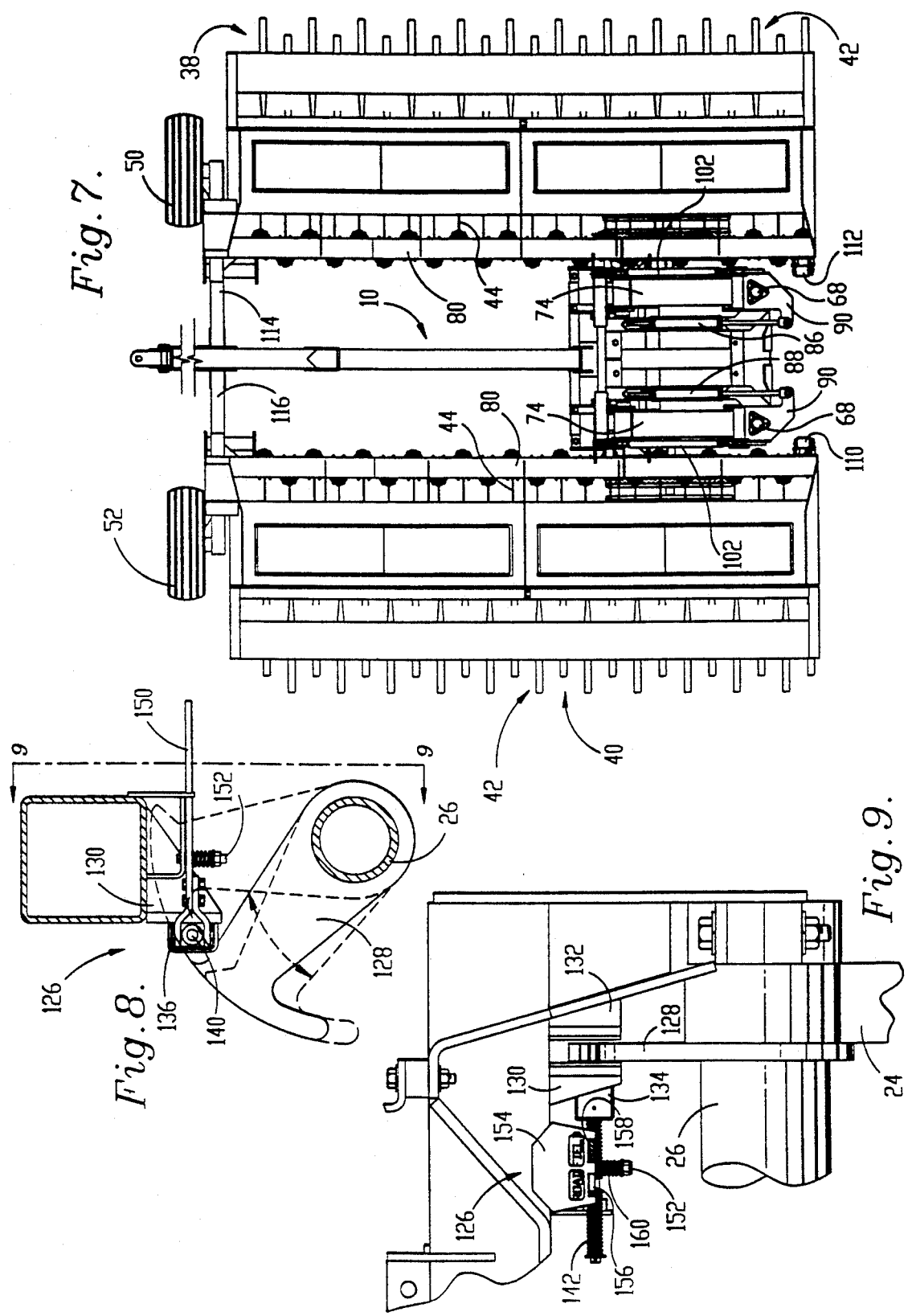

1

FRONT FOLDING NO-TILL DRILL

TECHNICAL FIELD

This invention relates to folding agricultural implements and, more particularly, to a multiple-section, no-till grain drill having two wing sections which can be folded forwardly into a compacted position for transport, notwithstanding the presence of considerable trash and residue cutting apparatus on the machine tending to interfere with folding of the wing sections into a compact configuration.

BACKGROUND

Machines which are designed to plant seeds in soil which has not been tilled to incorporate crop residue from the previous season require the use of some kind of residue cutting apparatus coupled in leading relationship to the trench-forming and seed-depositing mechanism to enable the mechanism to perform properly. Whereas the trench-forming and seed-depositing means are typically located back under the frames and seed boxes of the units and, thus, present no particular interference problems during forward folding of separate sections of the machine for transport purposes, the residue severing apparatus projects sufficiently far forwardly and hangs down low enough in such forwardly disposed position as to present clearance problems with other portions of the machine when trying to maintain a narrow transport width by folding the machine forwardly.

SUMMARY OF THE INVENTION

Accordingly, one important object of the present invention is to provide a folding construction for multiple section implements which is particularly useful in connection with two wing sections of front folding, no-till grain drills and the like. In this regard, the present invention contemplates having the two wing sections of the machine not only swingable forwardly into transport positions, but also liftable fully off the ground and into raised positions prior to folding so that all of the residue cutters and other associated equipment adequately clears transport wheels associated with the main fore-and-aft carrier frame of the machine. Notwithstanding being liftable into raised positions for folding and unfolding, each of the wing sections is enabled to flex or float about fore-and-aft axes during field operations as changes in ground contour are encountered by gauge wheels on the wing sections, and means are provided to limit the extent of float during both field operations and raising and lowering of the sections so they are under firm, positive control during elevation and movement between the folded and unfolded positions thereof. Special transport lock mechanism is provided to facilitate use of a mechanical device that takes the load off hydraulic cylinders during transport of the machine with the sections in a folded condition.

BRIEF DESCRIPTION OF THE DRAWINGS

FIG. 3 is a left side elevational view of the machine in the field working position;

FIG. 7 is a top plan view of the machine in a folded condition;

FIG. 8 is an enlarged, fragmentary detailed view of one of the transport locks of the machine showing alternate positions of one member of the lock in phantom lines;

FIG. 9 is an enlarged, fragmentary front elevational view of one of the transport locks taken substantially along line 9—9 of FIG. 8;

FIG. 23 is a fragmentary top plan view of the rear portion of the machine illustrating the manner in which the guide rollers on the drill units swing into load-bearing engagement with wear plates on the main frame;

FIG. 24 is an enlarged, fragmentary cross-sectional view of one of the guide rollers taken substantially along line 24—24 of FIG. 23.

DETAILED DESCRIPTION

Figure 1:
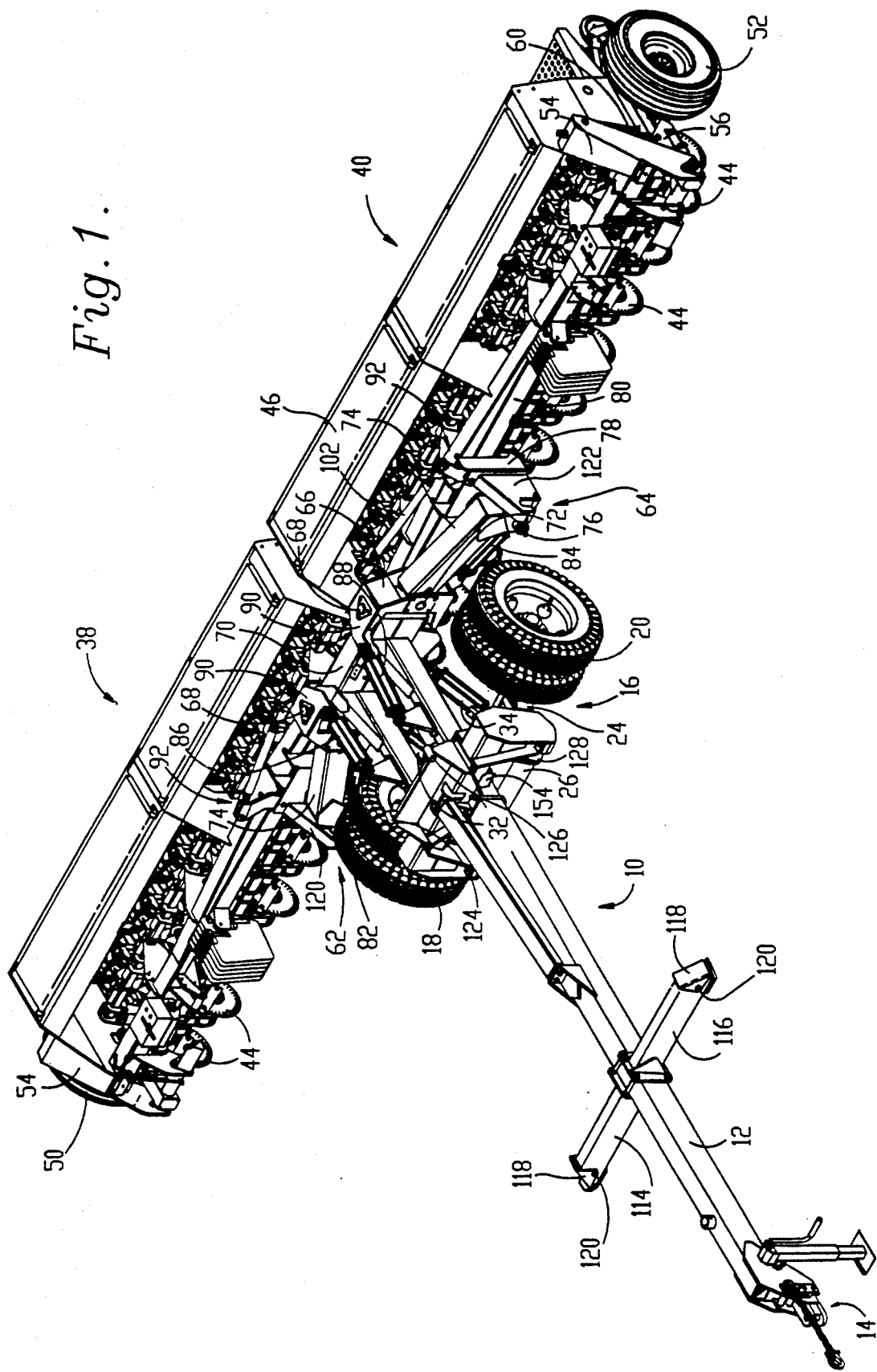
FIG. 1 is top, left, front isometric view of a two-section, no-till grain drill constructed in accordance with the principles of the present invention.

Throughout the drawings and the description which follows, a machine is disclosed which is in the nature of a front-folding grain drill having two individual wing sections or drill units. It will be appreciated, however, that the principles of the present invention may also be utilized in machines having more than two sections, and in both front-fold and rear-fold machines. In addition to drills, the principles of the present invention may also be employed in planters, seeders, and other types of farm equipment.

The grain drill selected for illustration includes a fore-and-aft carrier frame 10 that includes a tongue 12 having a hitch 14 at its forwardmost end for connecting the drill with a towing vehicle (not shown). Near the back end of the carrier frame 10, the frame is provided with a transport wheel assembly 16 that supports the carrier frame 10 for over-the-ground travel. Assembly 16 includes a pair of dual transport wheels 18 and 20 carried at the lower, rear ends of a pair of wheel arms 22 and 24 (see FIGS. 1–6). The upper, forward ends of the wheel arms 22,24 are rigidly affixed to a transverse torque tube 26 (FIGS. 4, 8, 9, 17, 18) that passes beneath the carrier frame 10 and is journaled at its opposite ends for rotation by a pair of journals 28 and 30 (FIG. 4) carried by downwardly projecting portions of the carrier frame 10. A pair of hydraulic transport cylinders 32 and 34 are connected between the bottom of the carrier frame 10 and a transverse bar 36 (FIG. 4) which rigidly interconnects the wheel arms 22,24 such that the carrier frame 10 is raised and lowered relative to the transport wheels 18,20 during extension and retraction of the transport cylinders 32,34.

The drill also includes a pair of wing sections or drill units 38 and 40 which are coupled with the carrier frame 10 for movement over the ground. The two drill units 38,40 are essentially identical to one another, with the exception that the unit 38 is adapted to be disposed on the right side of the carrier frame 10 when the machine is unfolded as in FIG. 1, while the unit 40 is designed for placement on the left side of the frame 10. As perhaps shown best in the rear folded view of FIG. 4, each of the units 38,40 has a series of openers 42 which project from the bottom of the unit and are designed to open side-by-side trenches in the soil as the drill is advanced, to deposit seeds in the trenches, and then to recover and firm the seeds in preparation for subsequent germination and emergence. In the illustrated embodiment, the openers 42 are in the form of double-disc openers mounted on conventional parallel linkage. However, it is to be understood that the openers 42 may take a variety of forms and still remain within the principles of the present invention. For space reasons, the openers 42 beneath each of the units 38,40 are staggered in a fore-and-aft direction. Additionally, each opener 42 is provided with trash and residue cutting apparatus 44 located in line with and ahead of the opener for the purpose of severing stalks and other surface crop residue which would otherwise interfere with proper operation of the openers 42. In the illustrated embodiment the residue cutting apparatus 44 takes the form of relatively sharp, ground-driven discs, although other appropriate devices could be utilized. Each of the drill units 38,40 includes a long, single seed box 46 with a pair of end-to-end compartments located above the series of openers 42 and communicating with the latter through suitable hoses to supply seeds in the usual manner.

The drill units 38 and 40 are also provided with end support wheels 50 and 52, respectively, that serve to gauge the operating depth of the openers 42 and the trash cutters 44. A downwardly and forwardly inclined bracket 54 (FIGS. 1, 3, and 5) at the outer end of each drill unit 38, 40 is rigid to the frame of the unit and has a generally fore-and-aft wheel arm 56 pivotally coupled to its lower end. The end wheels 50,52 are journaled by the wheel arms 56 at their rear ends, and the two brackets 54 are provided with hydraulic depth control cylinders 58 and 60, respectively (FIGS. 1, 3, and 5), that extend between the upper end of the brackets 54 and the wheel arms 56 to cause raising and lowering of the seed boxes 46,48, the openers 42, and the cutters 44 relative to the end wheels 50, 52. As described in more detail below, the depth control cylinders 58,60 are connected in the same circuit with the transport cylinders 32,34 such that the carrier frame 10 and the drill units 38,40 all move up and down together during extension and retraction of the cylinders 32,34 and 58,60.

The drill units 38,40 are connected to the carrier frame 10 using a pair of special couplings which are broadly designated by the numerals 62 and 64. Each of the couplings 62,64 includes an upright bracket 66 that has a vertical pivot 68 with the outermost lateral end of a rigid cross-head 70 at the rear of the carrier frame 10.

Each bracket 66 also has a horizontal lift pivot 72 with the inner end of a tool bar 74, the outer, downturned end of which has a fore-and-aft horizontal flotation pivot 76 with the body of the corresponding drill unit 38 or 40. In the illustrated embodiment, the flotation pivot 76 is connected between the tool bar 74 and a box-like structure 78 which is rigidly affixed to a long, transverse front beam 80 of the frame of the drill unit 38 or 40. The two tool bars 74 of the couplings 62,64 are provided with hydraulic lift cylinders 82 and 84 which are connected between the outer end of the tool bar 74 and their respective brackets 66 for raising and lowering the tool bars 74. A pair of hydraulic swing cylinders 86 and 88 along the top of the carrier frame 10 are connected between the frame 10 and cranks 90 fixed to the upper ends of the brackets 66 for swinging the brackets 66 through 90 degree arcs in a fore-and-aft direction from the field position of FIGS. 1 and 2 to the folded, transport position of FIG. 7.

As a result of the horizontal pivots 76 between the tool bars 74 and the drill units 38,40, the drill units 38,40 are provided with the ability to flex as need be to accommodate changes in ground contour experienced by the end wheels 50,52. As the end wheels 50,52 experience rises and falls in the terrain which may not be simultaneously experienced by the carrier wheels 18,20, each drill unit 38,40 can rock rotatively about its own independent flotation pivot 76 to a certain extent necessary to accommodate such change in terrain. However, the amount of such flotation is subject to limitation as determined by limit means broadly denoted by the numeral 92 in connection with each coupling 62 and 64.

Figure 22:
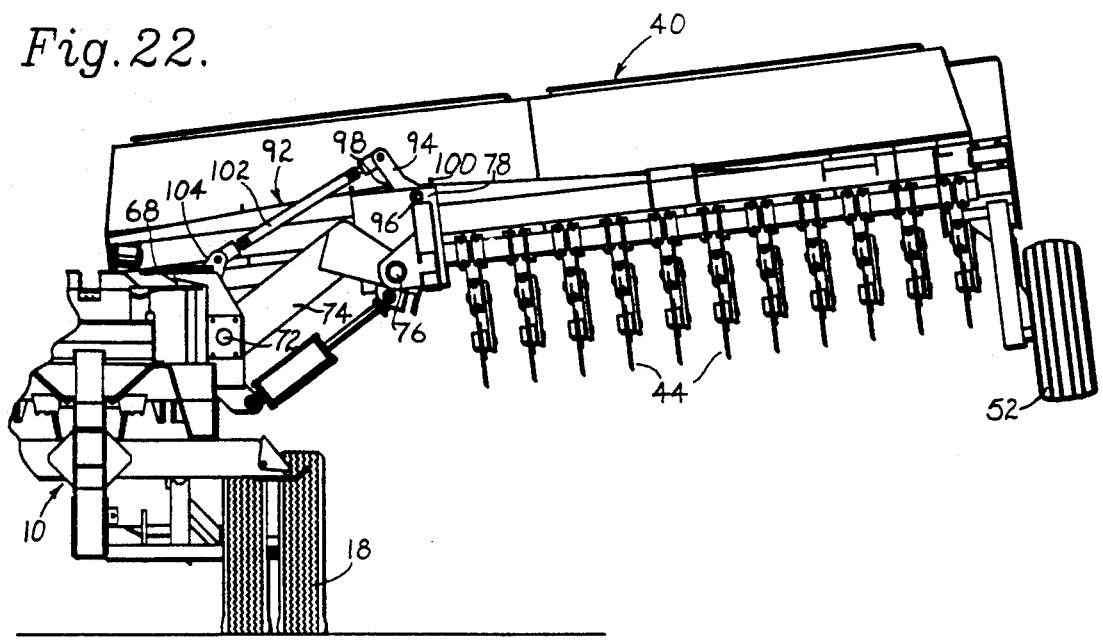
FIGS. 20, 21, and 22 are fragmentary, front elevational views of the machine illustrating the manner in which the flotation limit of one of the wing sections also serves to assist in lifting of the wing section to its clearing position for folding.
Figure 21:
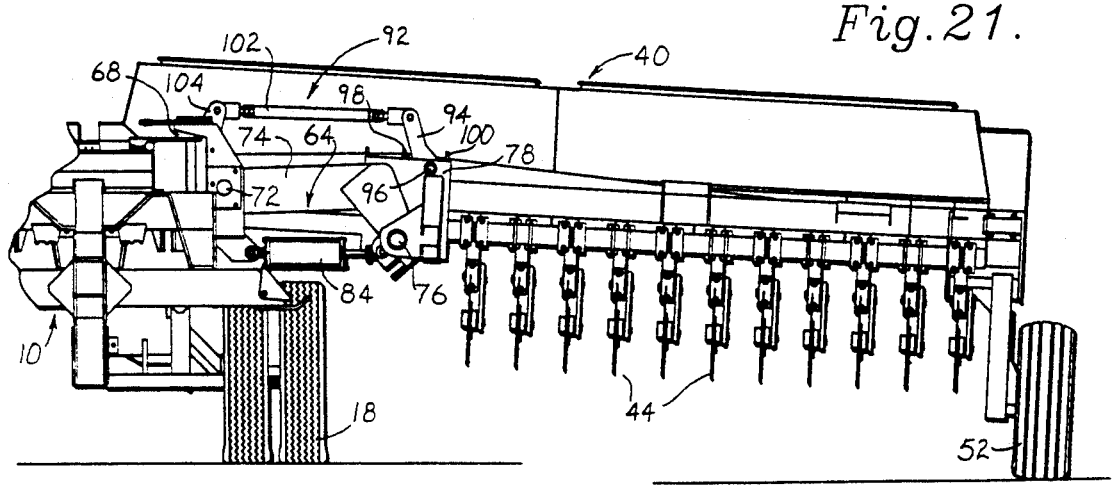
Figure 20:
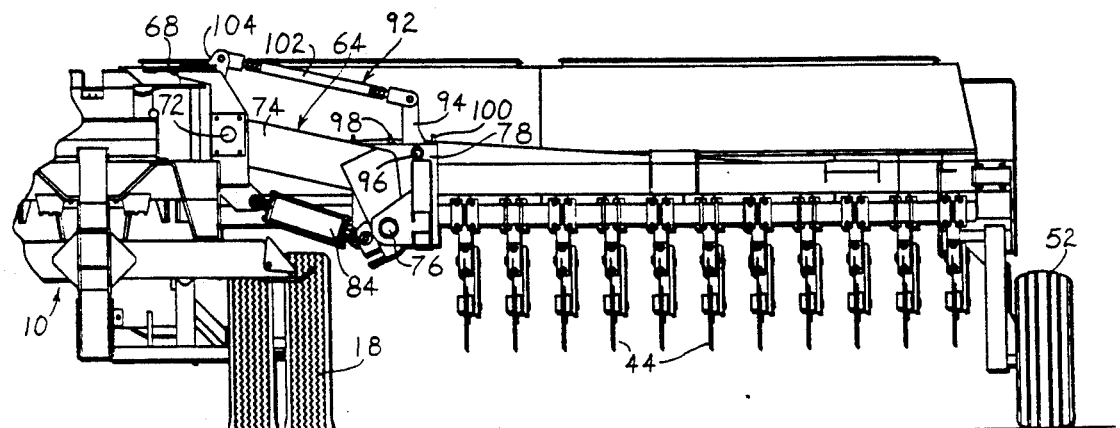

As shown particularly in FIGS. 20, 21, and 22, each limit means 92 includes upstanding crank 94 that is pivotally connected to the box-like structure 78 by a fore-and-aft pivot 96 so the crank 94 can swing to the left and to the right about the axis of the pivot 96. However, the crank 94 can only pivot in opposite directions to the extent permitted by the stops 98 and 100 which are positioned to be engaged by the crank 94 after not more than approximately eleven degrees of travel away from the vertical position of FIG. 20. A rigid limit link 102 is connected between the upper end of each crank 94 and a lug 104 on the upper end of the bracket 66, such link 102 being adjustable lengthwise for centering the crank 94 into the nominal position of FIG. 20 in which the crank 94 is spaced equally from both stops 98,100 and the drill unit 38 or 40 is essentially horizontally diposed. As the drill unit 38 or 40 rocks about the flotation pivot 76 during field operations, the crank 94 remains upright, but rocking of the drill unit 38 or 40 causes one or the other of the stops 98,100 to come closer to the crank 94, depending upon the direction of rocking motion. The limit means 92 also serves effectively during lifting of the drill units 38,40 for folding, as will hereinafter be explained with respect to FIGS. 21 and 22.

Figure 2:
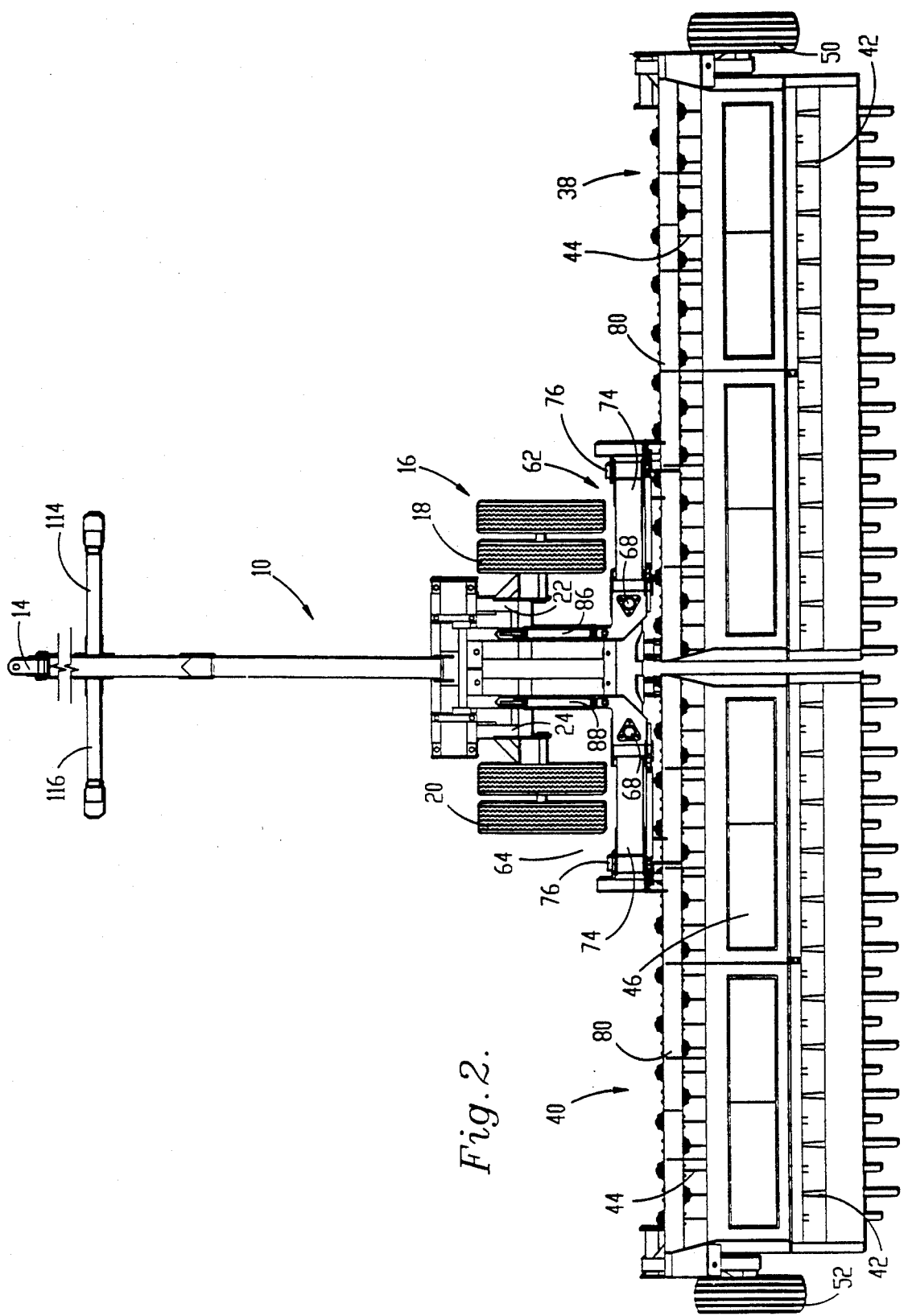
FIG. 2 is a fragmentary, top plan view of the machine in FIG. 1 with details of construction shown somewhat more schematically than that of FIG. 1.
Figure 4:
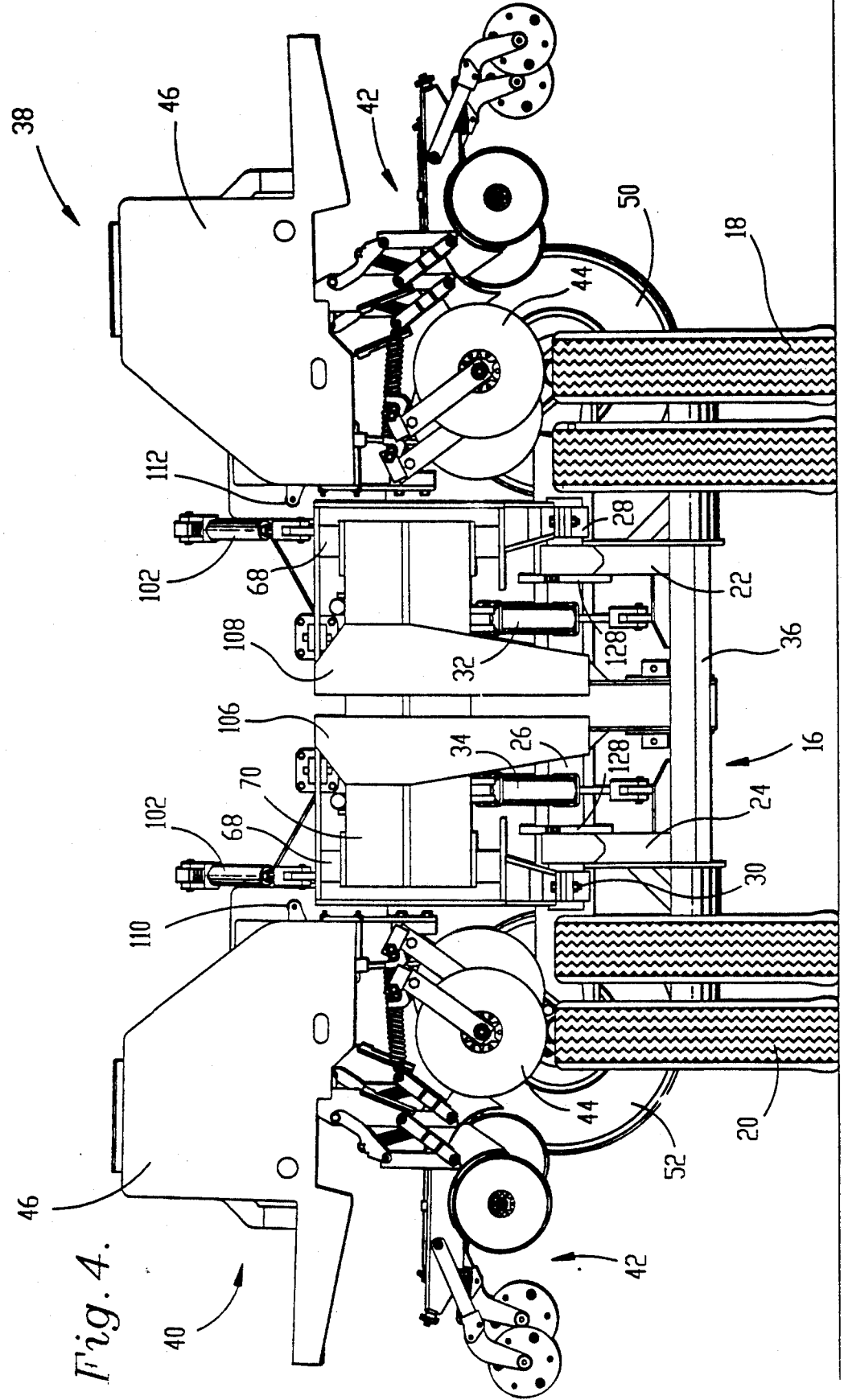
FIG. 4 is a rear elevational view of the machine in its folded position.

As shown in detail in FIGS. 4 and 23, the cross-head 70 at the rear of the carrier frame 10 has a pair of slightly laterally spaced, upright wear plates 106 and 108 on its backside. Such wear plates 106,108 are in position to be engaged by anti-friction rollers 110 and 112 respectively on the drill units 40 and 38 when the machine is in its field working position, as illustrated in FIGS. 1, 2, and 3. The rollers 110,112 and the wear plates 106,108 serve as a positive mechanical stop for the drill units 38,40 when the units are swung to their working positions from folded positions and also provide anti-friction guidance for the inner ends of the units 38,40 as they floatingly rock about their respective flotation pivots 76. The rollers 110,112 are so designed that they can be adjustably positioned closer to or farther away from the main beams 80 of the units 38,40 to thereby provide slight adjustment in the angle at which the drill units 38,40 face forwardly in the direction of travel.

OPERATION

As the drill is pulled over a field, and drilling operations are performed, the machine is in the unfolded, field working position of FIGS. 1, 2, 3, and 16 in which the wing sections or drill units 38,40 are disposed end-to-end and extend in transverse relation to the direction of travel of the machine. The depth of penetration of the openers 42 and the cutters 40 into the soil is determined by the gauging end wheels 50,52 and the carrier wheels 18,20. By extending or retracting the transport cylinders 32,34 and the depth control cylinders 58,60, the carrier frame 10 and the drill units 38,40 will be simultaneously lowered to adjust the depth of the cutters 44. Preferably, a depth control stop (not shown) is associated with transport cylinder 34 which is arranged with the cylinder 32 in a master-slave, rephasing relationship with the depth control cylinders 58,60 for the end wheels 50,52. It will be appreciated that during normal field operations, the tool bars 74 remain at a constant, lowered position with the lift cylinders 82,84 retracted as shown in FIG. 1. When the operator comes to the end of a row, the transport cylinders 32,34 and the depth control cylinders 58,60 are extended to their fullest extent so as to lift the openers 42 and the cutters 44 entirely out of the ground as seen, for example, in FIGS. 17 and 20. The operator is then free to turn the machine around or otherwise move the machine without performing any planting functions.

Figure 18:
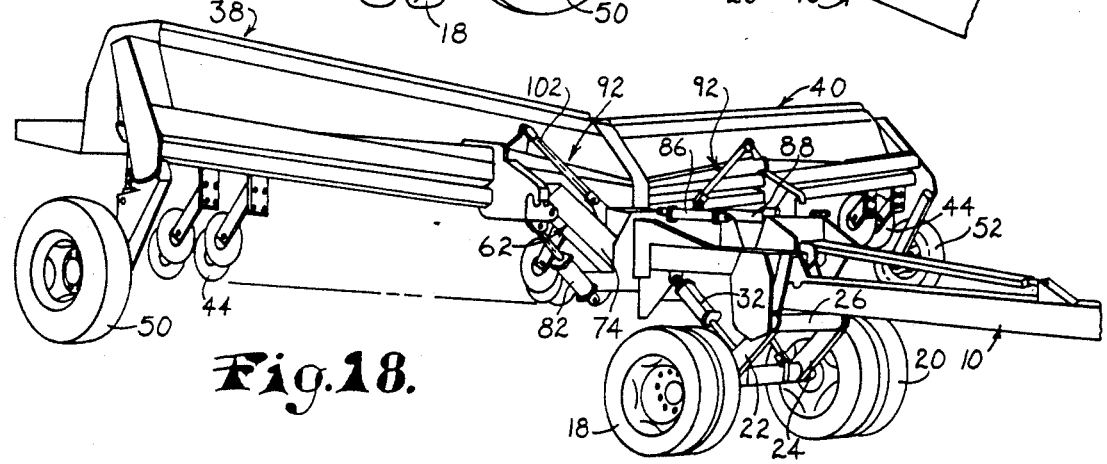
Figure 17:
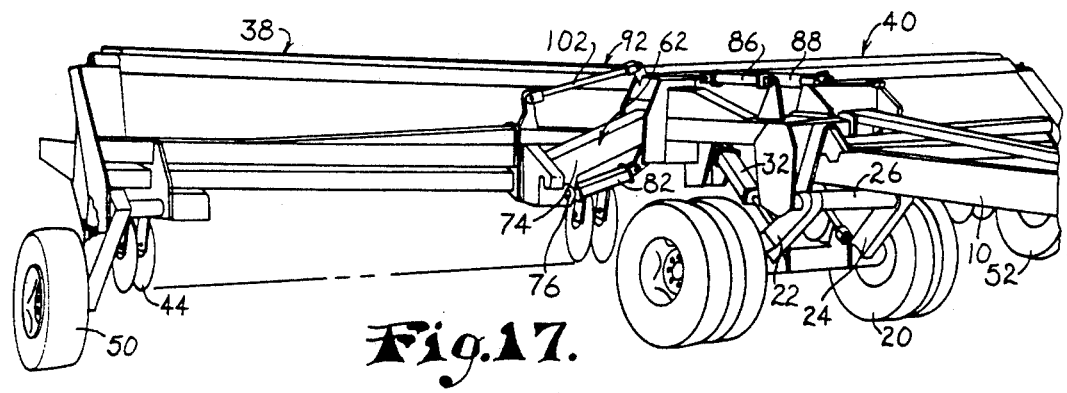
Figure 16:
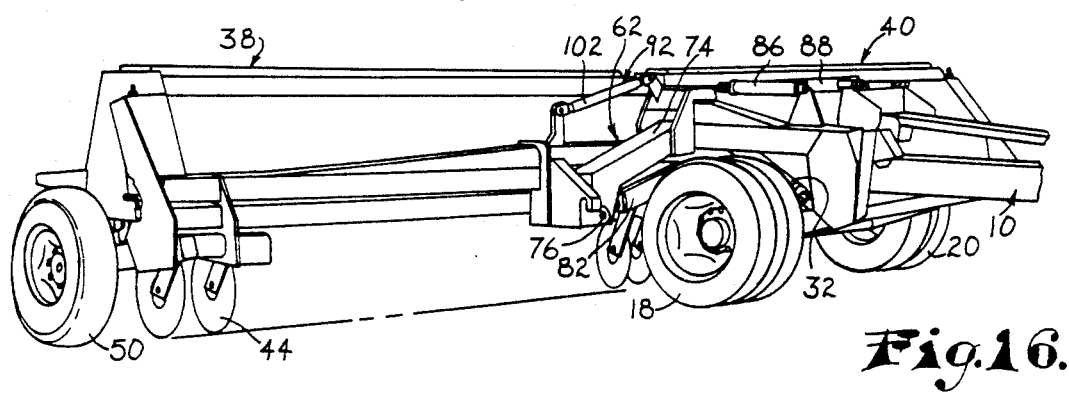

When the operator wants to fold the drill into its compacted condition, the drill units 38,40 are first fully raised to the FIG. 17 position as previously described. In this position, however, the cutters 44 would strike the transport wheels 18,20 if the drill units 38,40 were folded forwardly at this juncture. Therefore, before commencing forward folding, the lift cylinders 82,84 are first extended to their fullest extent, resulting in both drill units 38,40 and their end wheels 50,52 being raised into an elevated position, as shown in FIG. 18, in which the cutters 44 are disposed at a level above that of the carrier wheels 18,20. It is to be noted in this respect that during extension of the lift cylinders 82,84, the drill units 38,40 initially cant outwardly as shown in FIG. 21 while their respective end wheels 50,52 remain engaged with the ground. However, once the cranks 94 come into engagement with the inner limit stops 98 due to pulling on the cranks 94 by the links 102 as the drill units 38,40 cant outwardly, the links 102 thereafter prevent further canting and cause the drill units 38,40 to be raised completely off the ground and into elevated positions, as illustrated in FIGS. 18 and 22. Once the drill sections 38,40 are fully elevated, the swing cylinders 86,88 may be extended, causing the drill units 38,40 to slowly fold forwardly about the upright pivots 68 until the folded position of FIG. 19 is reached.

Figure 5:
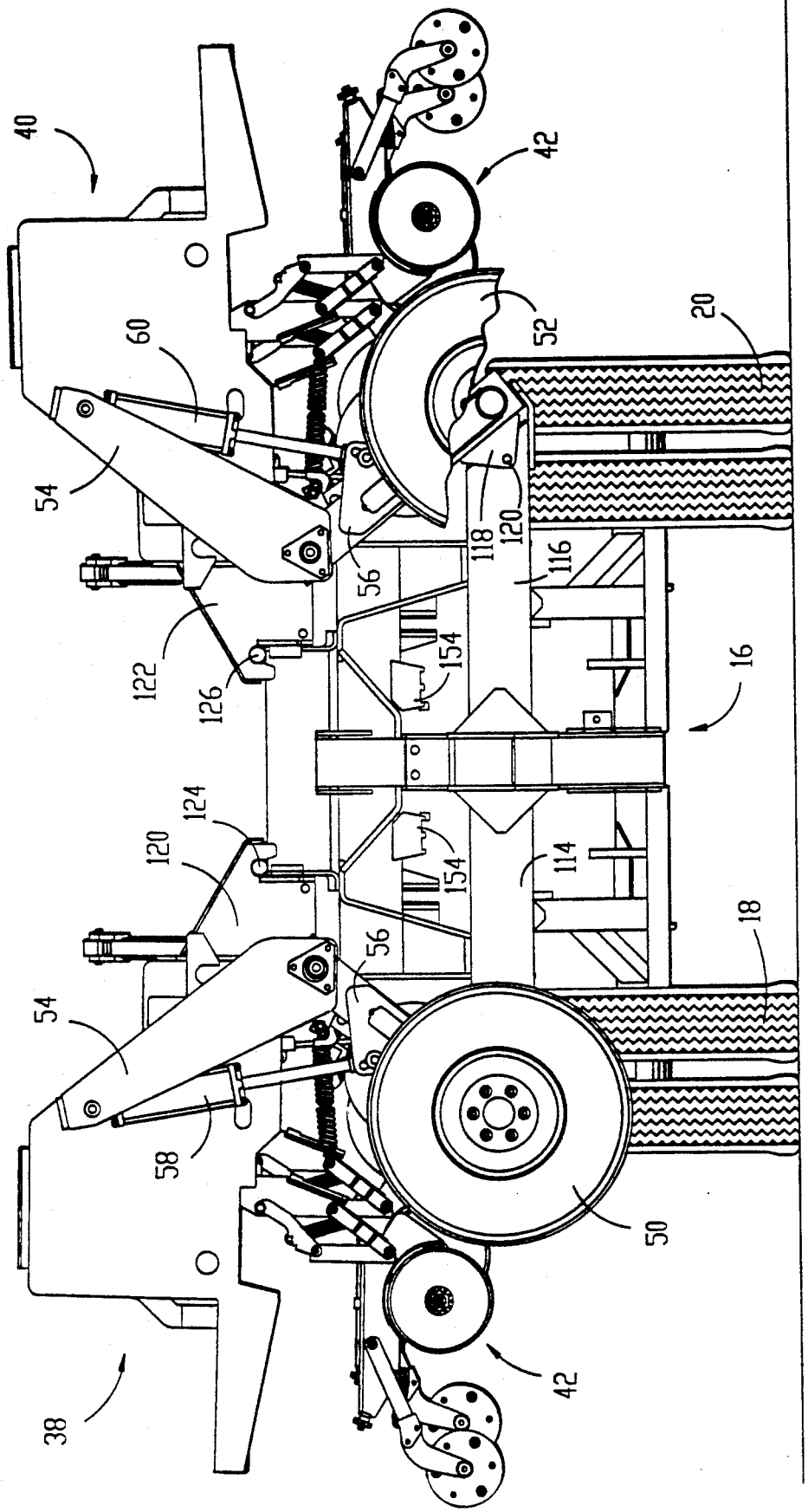
FIG. 5 is a front elevational view thereof in a folded condition, parts being broken away to reveal details of construction.
Figure 6:
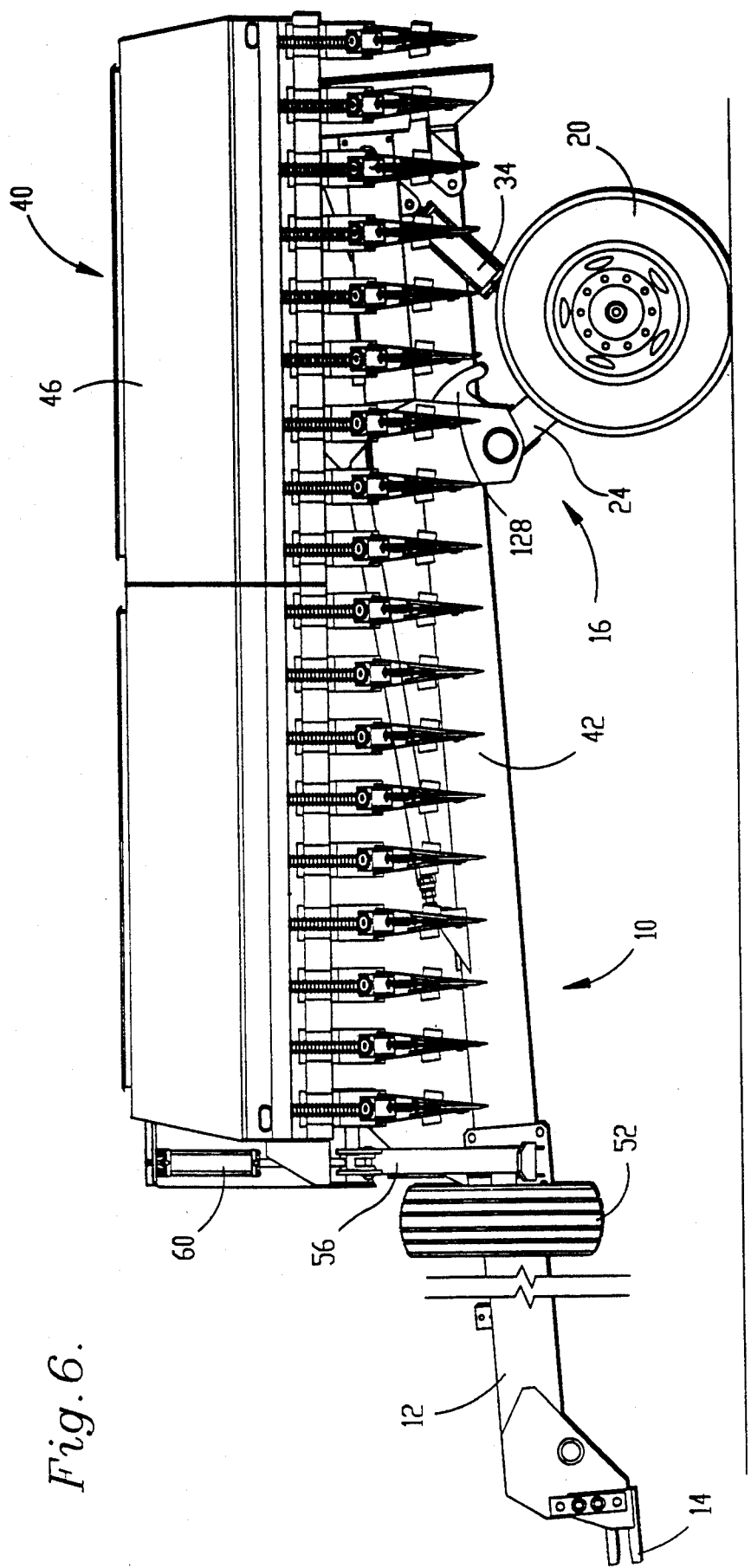
FIG. 6 is a left side elevational view of the machine in a folded condition.
Figure 19:
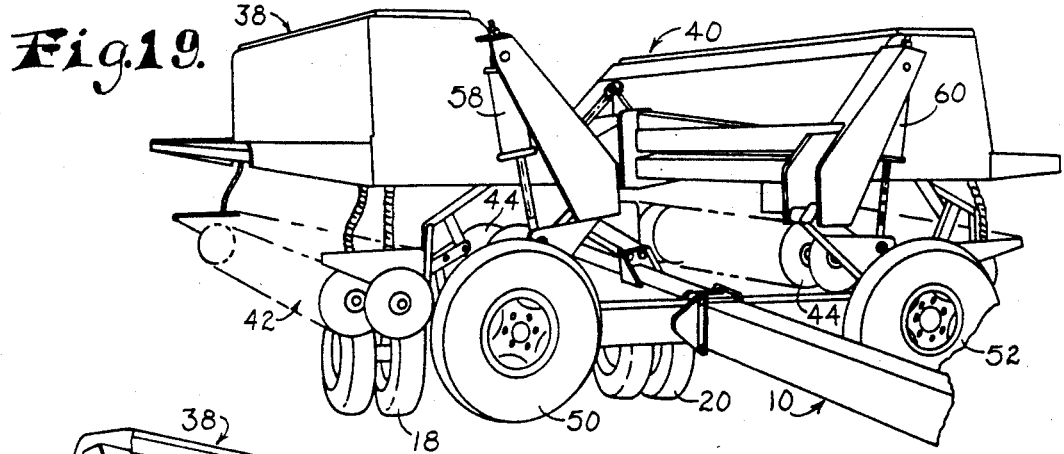
FIGS. 16–19 are fragmentary, right, front perspective views of the machine illustrating the sequence of steps involved in folding the wing sections from their field working position to their front folded position.

The folded position of FIG. 19 corresponds to the condition of things as shown in FIGS. 4, 5, 6, and 7. As shown in such figures, when the drill units 38,40 are fully folded into positions paralleling the carrier frame 10, the wheel arms 56 associated with the end wheels 50,52 come into overlying relationship with outrigger support arms 114 and 116. Each of the support arms 114,116 has a self-centering, inclined seat 118 pivoted to the outer end of the respective arm 114,116 by a fore-and-aft pivot 120. Such seats 118 are disposed to underlie and bear against the inclined front surfaces of the end wheel arms 56 for assisting in bearing the load of the folded drill units 38,40 after the lift cylinders 82,84 have been slightly relieved to allow the drill units 38,40 to settle into transport position. It will also be appreciated, as shown in FIG. 5 in particular, that downwardly opening hooks 120 and 122 on the drill units 38,40 come into overlying relationship with forwardly projecting, cylindrical locking bars 124 and 126 when the drill units 38,40 are folded forwardly such that, when the units 38,40 then settle downwardly onto the seats 118, the hooks 120,122 slip onto and capture the bars 124,126 to retain the drill units 38,40 in a folded condition. In this condition the machine may be readily transported through gates and along roadways until it is again ready for use, at which time the machine may be unfolded by simply reversing the foregoing procedure.

The drill of the present invention is also provided with a safety transport lock which takes the load off the transport cylinders 32 and 34 whenever the carrier frame 10 is fully raised. In this respect, and as shown particularly in FIGS. 8-15, there is a transport lock broadly denoted by the numeral 126 on each side of the carrier frame 10 just forward of the transport wheels 18,20 (only one of such locks being illustrated). One component of each transport lock 126 comprises a rigid plate member 128 fixed to the torque tube 26 immediately beside the corresponding wheel arm 22 or 24 and inboard thereof (see also FIG. 4). Thus, the plate member 128 rocks with the torque tube 26 between the phantom line positions illustrated in FIG. 8 as the wheel assembly 16 is operated by the lift cylinders 32,34 between its opposite extremes.

Such movement of the plate member 128 permits it to slip between a pair of guide plates 130,132, depending upon the position of a blocking bar 134 which may be shifted into a position spanning the two plates 130,132 and thus denying access to such position by the plate member 128.

Figure 10:
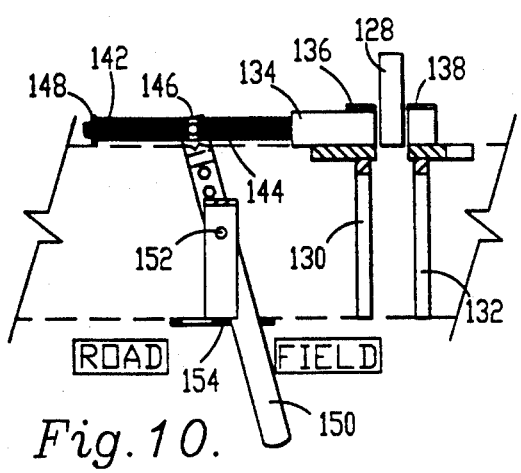
FIGS. 10–15 are enlarged, fragmentary diagrammatic views illustrating the various operational positions of the transport lock and its manner of use.

The blocking bar 134 of each transport lock 126 is designed to be shifted horizontally across the backside of the guide plates 130,132 through generally U-shaped guides 136 and 138 (FIGS. 8 and 10-15). The bar 134 is moved by a transverse drive shank 140 having a pair of coiled compression springs 142 and 144 which encircle the shank 140 and are separated by a slide collar 146 (FIG. 10). A shoulder in the form of a retaining washer 148 at the outer end of the shank 140 keeps the springs 142 and 144 from slipping off the shank 140 in a direction away from the blocking bar 134, and the collar 146 is connected to the rear end of a fore-and-aft actuating lever 150 swingable horizontally about an upright pivot 152. The front end of the lever 150 projects forwardly beyond an upright latch plate 154 having a pair of laterally spaced downwardly opening notches 156 and 158 therein corresponding to "road" and "field" positions respectively. Such notches 156 and 158 are adapted to alternatively receive the lever 150 which is spring biased upwardly by a coil spring assembly 160 encircling the pivot pin 152 but allowing the lever 150 to be selectively removed from and inserted into chosen ones of the notches 156,158.

Figure 15:
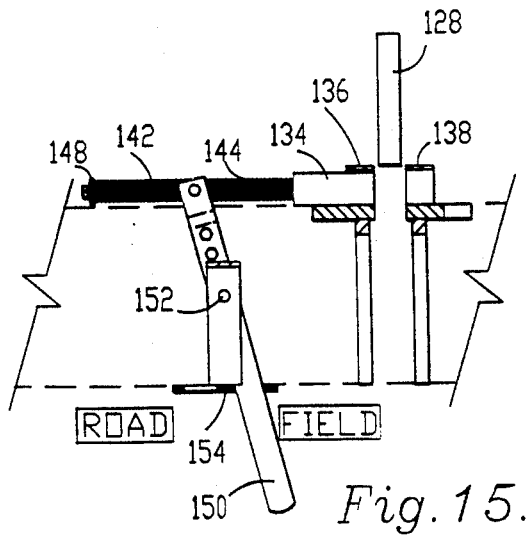

It will be appreciated that when the levers 150 of the transport locks 126 are in their field positions such as illustrated in FIG. 10, the plate members 128 are free to rock into and out of the space between the guides 136,138 because the blocking bars 134 are retracted from such space and present no obstruction to the plate members 128. FIG. 10 corresponds to the condition of things when the carrier frame 10 is fully lowered, in which event the plate member 128 of each transport lock 126 is slipped between the guides 136,138; on the other hand, FIG. 15 illustrates the condition of things when the carrier frame 10 is fully raised and the wheel assembly 16 has been rotated sufficiently far as to cause the plate member 128 to be fully out of the space between the guides 136,138.

Figure 11:
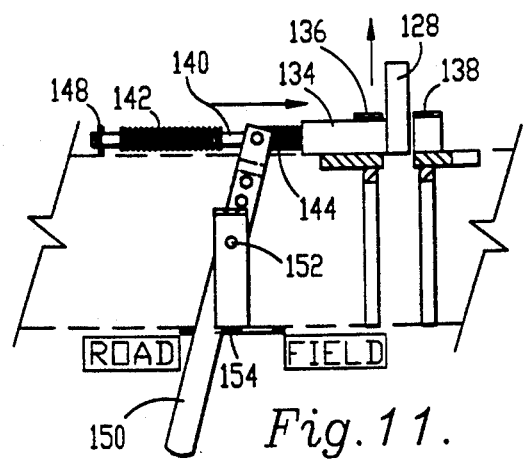
Figure 12:
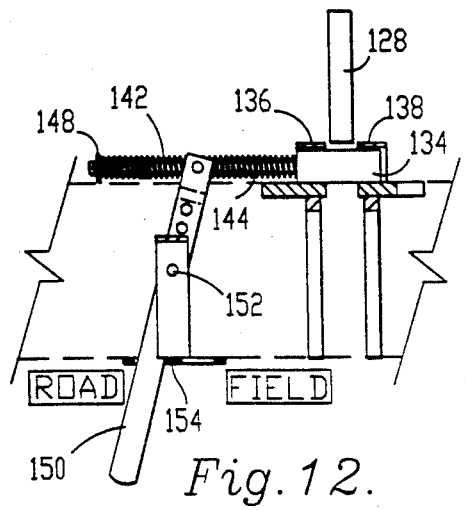
Figure 13:
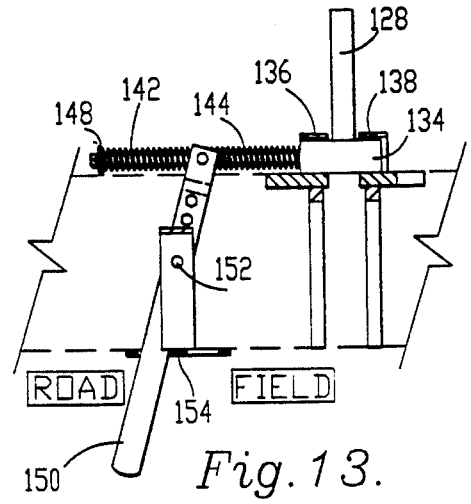
Figure 14:
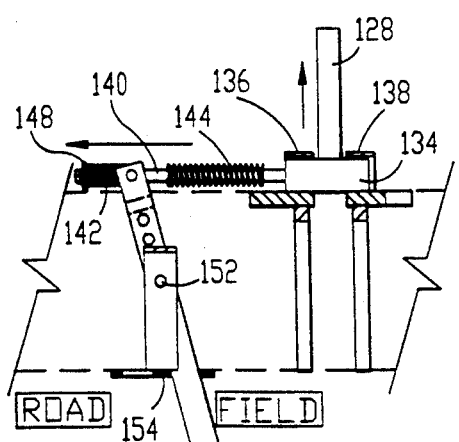

If the operator wishes to prepare the machine for transport, he may choose to climb down off the tractor and swing the levers 150 to the "road" position even before the carrier frame has been raised. Although the plate member 128 of each lock blocks shifting of the blocking bar 134 into the space between the guides 136,138 at this time, as illustrated in FIG. 11, actuation of the lever 150 into the road position merely causes the spring 144 to be compressed against the shoulder formed at the base of bar 134 by the collar 146 at the rear end of the lever 150. Then, as the transport cylinders 32,34 are actuated to raise the carrier frame 10, the plate member 28 of each lock is rotated back out of the guides 136,138, permitting the spring 144 to quickly shift the blocking bar 134 across the guides 136,138 as illustrated in FIG. 12, blocking access to the space between the guides 136,138 on the part of the plate 128. As the machine then settles slightly from its full raised position, the plate member 128 comes back toward the blocking bar 134 as shown in FIG. 13 and bears against bar 134 such that bar 134 receives the load of the plate member 128 and prevents further rotation of torque tube 26. If it is later desired to return the machine to the lowered field position, each of the levers 150 is moved to the "field" position, as illustrated in FIG. 14. However, if the blocking bars 134 of the locks are under considerable clamping load by the plate members 128, the blocking bars 134 will not be shifted out of the guides 136,138 and, instead, only the springs 142 will be compressed. As the carrier frame 10 is subsequently raised slightly, the bars 134 will snap out of the guides 136,138 under the influence of the stored energy in spring 142, until the position of FIG. 15 is achieved. At that time, the carrier frame 10 may be raised and lowered freely without interference by the blocking bars 134.

It will be appreciated that when going from the field condition to the road condition with the transport locks, the levers 150 need not be actuated while the carrier frame 10 is in a lowered condition with the plate members 128 located between the guides 136,138. The operator could wait until the carrier frame 10 has been fully raised, withdrawing the plate members 128 from the guides 136,138, and then climb down off the tractor and move the levers 150 into the road positions. The blocking bars 134 would be free to slip into the guides 136,138 under that sequence of events.

However, it is possible that if the tractor hydraulics used by the operator are not capable of holding the carrier frame 10 fully raised for a significant amount of time, the machine may settle between the time the operator climbs off the tractor and arrives at the levers 150 to move them into road position. Consequently, by making the transport locks 126 spring-loaded in the disclosed manner, the levers 150 may be shifted to the road positions even while the machine is fully lowered, all without harming any of the mechanisms. Then, when the machine is raised to its transport position, the blocking bars 134 will automatically snap into place.

Figure 25:
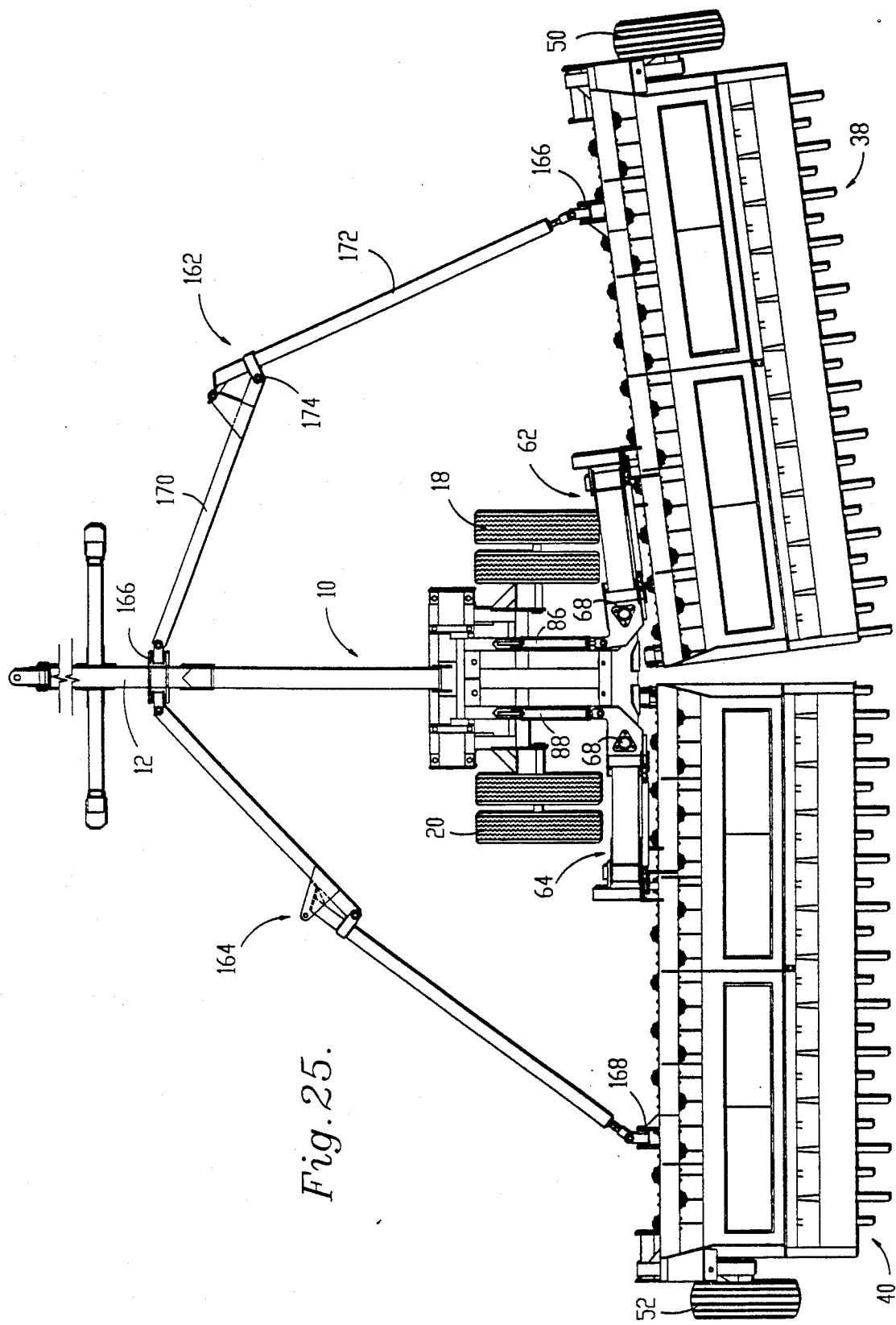
FIG. 25 is a top plan view of an alternate embodiment of the invention in which foldable push-pull bars are utilized to control swinging of the individual drill units during certain turning maneuvers.

FIG. 25 illustrates how the front folding drill of the present invention may be provided with foldable pull rods if desired without departing from the principles of the present invention. In this respect, it will be seen that the drill units 38,40 are provided with two foldable pull rods or links 162 and 164, respectively, connected between a forwardly disposed bracket 166 on the tongue 12 and respective lugs 166 and 168 on the drill units 38 and 40. Each of the pull rods 162,164 comprises a front link 170 and a rear link 172 pivotally interconnected by a vertical pivot 174 so that the rods 162,164 may buckle as necessary in the event one of the drill units 38,40 seeks to swing forwardly about its pivot 68 during field operation or folding. At other times, the pull rods 162,164 are essentially straight as illustrated with respect to the rod 164 in FIG. 25. Rods 162 and 164 help distribute some of the draft load to the front end of the tongue 12 which would otherwise be absorbed solely by the hinge mechanisms associated with the pivots 68 due to the unsupported outboard ends of the drill units 38,40 with respect to the path of travel.

It will be appreciated that during relatively sharp turns of the drill, there will be a tendency for the unit 38 or 40 on the "inside" of the turn to swing forwardly due to ground forces interacting with the end wheel 50 or 52. The forces are such that the inside end wheel 50 or 52 attempts to swing up into transverse alignment with the transport wheels 18,20, in order to avoid scuffing of the soil or formation of a divot by the affected end wheel 50 or 52. The hydraulic system on the towing vehicle should be set in a float position to permit the involved swing cylinder 86 or 88 as the case may be to extend slightly during such turns and allow the involved drill unit 38 or 40 to swing forwardly in a compensating manner, all of which is permitted also by the elbow jointed pull rods 162 and 164.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a multi-section, front-folding agricultural implement having a pair of wing sections which may be pivoted forwardly into generally fore-and-aft extending, transport positions from transversely extending, field working positions, the improvement comprising:
   a carrier frame having ground-engaging transport wheels supporting the frame for movement over the ground,
   said transport wheels being located forwardly of the wing sections when the wing sections are in their field working positions;

a pair of pivotal couplings between the frame and the wing sections adapting the latter for fore-and-aft pivoting movement about a pair of laterally spaced, upright axes betwen said transport and field working positions, said couplings including means adapting the wing sections for raising and lowering thereof relative to the carrier frame between lowered positions and raised positions in which the wing sections vertically clear the transport wheels for folding;

powered lift mechanism operably coupled with the wing sections for selectively effecting said raising and lowering of the wing sections relative to the carrier frame; and powered swing mechanism operably coupled with the wing sections for selectively effecting said pivoting movement of the wing sections between said transport and field working positions when the wing sections are in said raised positions.

2. In an agricultural implement as claimed in claim 1; and power means operably coupled between the transport wheels and the frame for selectively raising the frame into an elevated position in preparation for transport.

3. In an agricultural implement as claimed in claim 1, each of said wing sections including a series of opener units for making trenches in the soil as the implement is advanced, depositing seeds in the trenches, and covering the seeds with soil, each of said wing sections further including a series of cutters disposed in aligned, leading relationship with the respective opener units for severing crop residue ahead of the opener units.

4. In an agricultural implement as claimed in claim 3, each of said wing sections further including a ground-engaging depth control wheel assembly shiftable vertically relative to the opener units and the cutters for selectively shifting the opener units and the cutters into and out of engagement with the ground.

5. In an agricultural implement as claimed in claim 1, each of said wing sections including a ground-engaging support wheel, each of said pivotal couplings including a horizontal flotation pivot extending fore-and-aft when the wing sections are in their field working positions for permitting the wing sections to rock up and down about the flotation pivots in response to changes in ground contour experienced by their support wheels, each of said pivotal couplings further including limit means for preventing swinging of the wing sections beyond a predetermined limit about their flotation pivots during lifting of the wing sections into the raised positions thereof.

6. In a multi-section, front-folding agricultural implement having a pair of wing sections which may be pivoted forwardly into generally fore-and-aft extending, transport positions from transversely extending, field working positions, the improvement comprising:

a carrier frame having ground-engaging transport wheels supporting the frame for movement over the ground, said transport wheels being located forwardly of the wing sections when the wing sections are in their field working positions;

a pair of pivotal couplings between the frame and the wing sections adapting the latter for fore-and-aft pivoting movement about a pair of laterally spaced, upright axes between said transport and field working positions, said coupling including means adapting the wing sections for generally vertical movement between lowered positions and raised positions in which the wing sections clear the transport wheels for folding;

powered lift mechanism operably coupled with the wing sections for selectively effecting said vertical movement of the wing sections between the raised and lowered positions thereof; and powered swing mechanism operably coupled with the wing sections for selectively effecting said pivoting movement of the wing sections between said transport and field working positions when the wing sections are raised above the level of said transport wheels, each of said wing sections including a ground-engaging support wheel, each of said pivotal couplings including a horizontal flotation pivot extending fore-and-aft when the wing sections are in their field working positions for permitting the wing sections to rock up and down about the flotation pivots in response to changes in ground contour experienced by their support wheels, each of said pivotal couplings further including limit means for preventing swinging of the wing sections beyond a predetermined limit about their flotation pivots during lifting of the wing sections into the raised positions thereof, each of said pivotal couplings including a tool bar having said flotation pivot for the wing section at an outer end of the tool bar, each tool bar having a horizontal lift pivot at its inner end extending fore-and-aft when the wing sections are in their field-working positions and by which the outer end of the tool bar is swingable up and down during raising and lowering of the wing sections between said raised and lowered positions, said powered lift mechanism including a fluid pressure piston and cylinder assembly operably coupled with each tool bar, said tool bars, said horizontal pivots, said piston and cylinder assemblies and said limit means being swingable fore-and-aft with the wing sections during pivoting movement between said field working and transport positions.

7. In an agricultural implement as claimed in claim 6, each of said pivotal couplings further including a bracket connected to said frame for fore-and-aft pivoting movement about one of said upright aces, said tool bar of each coupling being connected at its inner end to said bracket by said horizontal lift pivot, said swing mechanism including fluid pressure piston and cylinder means connected between said frame and said brackets.

8. In a multi-section, front-folding agricultural implement having a pair of wing sections which may be pivoted forwardly into generally fore-and-aft extending, transport positions from transversely extending, field working positions, the improvement comprising:

a carrier frame having ground-engaging transport wheels supporting the frame for movement over the ground, said wing sections being coupled with the carrier frame and having ground-engaging depth control wheels adapting the wing sections for movement over the ground with the carrier frame;

powered depth control mechanism operably coupled with said transport wheels and said depth control wheels for raising and lowering said carrier frame and the wing sections together while the transport wheels and the depth control wheels remain in engagement with the ground;

powered swing mechanism operably coupled with the wing sections for selectively effecting said pivoting movement of the wing sections between said transport and field working positions, said wing sections being coupled with the carrier frame in a manner to permit the wing sections to be selectively raised and lowered relative to the carrier frame between raised and lowered positions; and powered lift mechanism operably coupled with the wing sections for selectively raising the wing sections relative to the carrier frame into said raised positions for vertically clearing the transport wheels during pivoting of the wing sections between their transport and field working positions.

9. In an agricultural implement as claimed in claim 8, each of said wing sections including a series of opener units for making trenches in the soil as the implement is advanced, depositing seeds in the trenches, and covering the seeds with soil, each of said wing sections further including a series of cutters disposed in aligned, leading relationship with the respective opener units for severing crop residue ahead of the opener units.

10. In an agricultural implement as claimed in claim 8, each of said wing sections having a horizontal flotation pivot between the wing section and the frame which extends fore-and-aft when the wing sections are in their field working positions and the depth control wheels are engaging the ground whereby to permit the wing sections to rock up and down about the flotation pivots in response to changes in ground contour experienced by their depth control wheels.

11. In an agricultural implement as claimed in claim 10; and means associated with said flotation pivots for preventing swinging of the wing sections beyond a predetermined limit about the flotation pivots during lifting of the wing sections into the elevated positions thereof.

12. In a multi-section, front-folding agricultural implement having a pair of wing sections which may be pivoted forwardly into generally fore-and-aft extending, transport positions from transversely extending, field working positions, the improvement comprising:

a carrier frame having ground-engaging transport wheels supporting the frame for movement over the ground, said wing sections being coupled with the carrier frame and having ground-engaging depth control wheels adapting the wing sections for movement over the ground with the carrier frame;

powered depth control mechanism operably coupled with said transport wheels and said depth control wheels for raising and lowering said carrier frame and the wing sections while the transport wheels and the depth control wheels remain in engagement with the ground;

powered swing mechanism operably coupled with the wing sections for selectively effecting said pivoting movement of the wing sections between said transport and field working positions;

powered lift mechanism operably coupled with the wing sections for raising the wing sections and their depth control wheels entirely off the ground and into an elevated position in which the wing sections clear the transport wheels during pivoting of the wing sections between their transport and field working positions, each of said wing sections having a horizontal flotation pivot between the wing section and the frame which extends fore-and-aft when the wing sections are in their field working position and the depth control wheels are engaging the ground whereby to permit the wing sections to rock up and down about the flotation pivots in response to changes in ground contour experienced by their depth control wheels; and means associated with said flotation pivots for preventing swinging of the wing sections beyond a predetermined limit about the flotation pivots during lifting of the wing sections into the elevated positions thereof.

each of said wing sections being coupled with the frame by structure that includes a tool bar having the flotation pivot for the wing section at an outer end of the tool bar, each tool bar having a horizontal lift pivot at an inner end of the tool bar which extends fore-and-aft when the wing sections are in their field working positions, said lift pivots being operable to permit the outer ends of the tool bars to swing up and down during raising and lowering of the wing sections toward and away from said elevated position, said powered lift mechanism including a fluid pressure piston and cylinder assembly operably coupled with each tool bar, said tool bars, said horizontal pivots, said piston and cylinder assemblies and said limit means being swingable fore-and-aft with the wing sections during pivoting movement between said field working and transport positions.

13. In an agricultural implement as claimed in claim 12, each of said tool bars having a bracket at its inner and connected to the tool bar by said horizontal lift pivot, each of said brackets being connected to the frame for fore-and-aft pivoting movement about one of said upright axes, said swing mechanism including fluid pressure piston and cylinder means connected between said frame and said brackets.

14. In a front-folding, no-till grain drill, the improvement comprising:

a generally fore-and-aft carrier frame having ground-engaging transport wheels supporting the frame for movement over the ground;

a pair of oppositely extending, transverse tool bars coupled with the frame at the rear of the latter for fore-and-aft swinging movement about a pair of laterally spaced, upright pivots during folding and unfolding of the drill;

a pair of elongated, transversely extending drill units coupled with respective ones of the tool bars in substantially end-to-end relationship for movement with the carrier frame along the ground, each of said drill units including a series of side-by-side openers for making trenches in the soil as the drill is advanced, depositing seeds in the trenches, and covering the seeds with soil, each of said drill units further including a series of cutters disposed in aligned, leading relationship with the respective openers for severing crop residue ahead of the openers, each of said drill units having at least one ground-engaging depth control wheel and being provided with a fore-and-aft, horizontal flotation pivot between the drill unit and the respective tool bars for permitting each unit to rock up and down about the flotation pivot in response to changes in ground contour experienced by the depth control wheel;

powered depth control mechanism operably coupled with said transport wheels and said depth control wheels for selectively raising and lowering the carrier frame and the drill units while the transport wheels and the depth control wheels remain in engagement with the ground;

powered swing mechanism operably coupled with the tool bars for selectively effecting said fore-and-aft swinging of the tool bars to move the drill units into and out of fore-and-aft, folded positions; and powered lift mechanism operably coupled with the tool bars for selectively swinging the tool bars upwardly relative to the frame to raise the drill units and their depth control wheels entirely off the ground into an elevated position in which the cutters clear the transport wheels during folding and unfolding of the drill units.

15. In a front folding no-till drill as claimed in claim 14; and limit means associated with each flotation pivot for preventing swinging of the drill units beyond a predetermined limit about their flotation pivots during field operations and during raising of the drill units into their elevated positions.

16. In a front folding no-till drill as claimed in claim 14, each of said drill units having an inner and an outer end, said flotation pivot for each drill unit being located between said inner and outer ends of the unit such that the inner ends of the units rock up and down about the flotation pivots as the depth control wheels encounter changes in ground contour, said carrier frame having rearwardly facing wear surfaces adjacent the inner ends of the drill units, said drill units being provided with anti-friction guide rollers at said inner ends thereof in disposition for rolling engagement with said wear surfaces of the frame during rocking movement of the drill units about said flotation pivots.

17. In a front folding no-till drill as claimed in claim 14, said depth control wheels for the drill units being located at outer ends of the units remote from the carrier frame and spaced rearwardly from the transport wheels when the drill units are in their unfolded position, said powered swing mechanism being operable during left and right turns of the drill to allow the inside drill unit with respect to the direction of turning to swing forwardly in response to ground forces acting against the depth control wheel of the inside drill unit, said drill units each having an elbow linkage connecting the unit generally adjacent its outer end with the carrier frame, each elbow linkage being operable to buckle freely during forward swinging of its corresponding drill unit.

18. In a front folding no-till drill as claimed in claim 14, said transport wheels having a mechanical transport lock for bearing the load otherwise placed on said powered depth control mechanism when the drill is folded for transport, said transport lock including a member movable with the transport wheels during raising and lowering of the carrier frame and a blocking bar shiftably carried by the frame for selective movement into and out of a position blocking said movement of the member in a direction which would permit lowering of the carrier frame from a raised position.

19. In a front folding no-till drill as claimed in claim 18, said transport lock further including an operating lever and means yieldably coupling the lever with said blocking bar for urging the latter toward said blocking position when the lever is placed in an operated position.

20. In a front folding no-till drill as claimed in claim 19, said yieldable coupling means being operable to yieldably urge the blocking bar out of said blocking position when the lever is placed in a second operated position.

21. In an agricultural implement having a plurality of tool sections including a pair of wing sections which may be pivoted into generally fore-and-aft extending, transport positions from transversely extending, field working positions, the improvement comprising:

a carrier frame having ground-engaging transport wheels supporting the frame for movement over the ground, said wing sections being coupled with the carrier frame and having ground-engaging depth control wheels adapting the wing sections for movement over the ground with the carrier frame;

powered depth control mechanism operably coupled with said transport wheels and said depth control wheels for raising and lowering said carrier frame and the wing sections together relative to the transport wheel sand the depth control wheels while the transport wheels and the depth control wheels remain in engagement with the ground;

powered swing mechanism operably coupled with the wing sections for selectively effecting said pivoting movement of the wing sections between said transport sand field working positions, said wing sections being coupled with the carrier frame in a manner to permit the wing sections to be selectively raised and lowered relative to the carrier frame between raised and lowered positions as well as rocked side-to-side about individual longitudinal flotation axes as the depth control wheels experience uneven terrain; and powered lift mechanism operably coupled with the wing sections for selectively raising the wing sections, their flotation axes, and their depth control wheels relative to the carrier frame entirely off the ground and into an elevated position for folding.

22. In an agricultural implement as claimed in claim 21,
said wing sections being adapted to fold forwardly into said transport position.

* * * * *